United States Patent
Hayashi

(10) Patent No.: US 7,373,536 B2
(45) Date of Patent: May 13, 2008

(54) FINE GRANULARITY HALT INSTRUCTION

(75) Inventor: Hiroo Hayashi, Round Rock, TX (US)

(73) Assignee: Kabushiki Kaisha Toshiba, Tokyo (JP)

( * ) Notice: Subject to any disclaimer, the term of this patent is extended or adjusted under 35 U.S.C. 154(b) by 300 days.

(21) Appl. No.: 10/911,418

(22) Filed: Aug. 4, 2004

(65) Prior Publication Data

US 2006/0031704 A1  Feb. 9, 2006

(51) Int. Cl.
*G06F 1/00* (2006.01)

(52) U.S. Cl. ............... 713/323; 713/400; 713/500; 712/206; 712/208

(58) Field of Classification Search ............... 713/500, 713/400, 323; 395/375; 712/206, 208
See application file for complete search history.

(56) References Cited

U.S. PATENT DOCUMENTS

| | | | | |
|---|---|---|---|---|
| 5,584,031 | A * | 12/1996 | Burch et al. ............... | 713/323 |
| 6,161,187 | A * | 12/2000 | Mason et al. ............... | 713/322 |
| 6,194,940 | B1 * | 2/2001 | Hunter et al. ............... | 327/298 |
| 6,292,045 | B1 * | 9/2001 | Bongiorno et al. ........... | 327/298 |
| 6,343,363 | B1 | 1/2002 | Maher et al. | |
| 6,381,705 | B1 * | 4/2002 | Roche ........................ | 713/601 |
| 6,405,321 | B1 * | 6/2002 | Segars ........................ | 713/400 |
| 6,408,432 | B1 * | 6/2002 | Herrmann et al. ........... | 717/139 |
| 6,671,795 | B1 * | 12/2003 | Marr et al. ................... | 712/220 |
| 6,687,838 | B2 * | 2/2004 | Orenstien et al. ............ | 713/320 |
| 6,874,098 | B2 * | 3/2005 | Tamemoto et al. ........... | 713/500 |
| 7,020,788 | B2 * | 3/2006 | Catherwood ................. | 713/322 |
| 2004/0098577 | A1 * | 5/2004 | Sane et al. .................... | 713/2 |
| 2006/0005051 | A1 * | 1/2006 | Golla et al. ................... | 713/300 |

FOREIGN PATENT DOCUMENTS

| | | |
|---|---|---|
| JP | 05-040621 | 2/1993 |
| JP | HEI6-290042 | 10/1994 |
| JP | P2003-29965 A | 1/2003 |

OTHER PUBLICATIONS

IA-32 Intel Architecture Software Developer's Manual, vol. 2: Instruction Set Reference, 2003.

* cited by examiner

*Primary Examiner*—Thomas Lee
*Assistant Examiner*—Vincent T Tran
(74) *Attorney, Agent, or Firm*—Sprinkle IP Law Group

(57) ABSTRACT

Systems and methods for halting the execution of instructions in a microprocessor are disclosed. The halt instruction may have an operand which allows a programmer to specify which clock of a system is to be utilized in conjunction with the halt instruction. A specified number of clock cycles may then be counted using the clock identified in the instruction, after which dispatch of instructions may resume. These system and methods may also allow the execution of instructions to be halted with respect to one or more of a multiplicity of threads within a microprocessor while allowing the continued execution of instructions associated with the remaining threads.

29 Claims, 5 Drawing Sheets

FINE GRANULARITY HALT INSTRUCTION

TECHNICAL FIELD OF THE INVENTION

The invention relates in general to methods and systems for managing and controlling the execution of a microprocessor, and more particularly, to methods and systems for halting the execution of instructions in a microprocessor.

BACKGROUND OF THE INVENTION

Electronic systems are becoming a staple of modern life. These electronic systems may be very simple systems, such as individual logic gates that are used for simple control circuits, moderately complex systems, such as integrated logic circuits that are used for controllers and embedded processors, or much more complex systems utilized in powerful computing architectures.

Almost universally, the power requirements for these electronic systems have been increasing. This is especially true when referring to microprocessor based computing systems. Besides the display, the largest consumer of power in a computing system is the CPU microprocessor, and the higher the clock frequency of the microprocessor the greater that microprocessor's power consumption (all other aspects being equal). Prior techniques for reducing the power consumption of a microprocessor have reduced the speed of the system clock (or turned off the clock altogether) during periods of inactivity. These techniques, however, are costly because of the additional complicated circuitry needed for the storing and restoring of the state of the computer when the system clock is turned off.

Additionally, these techniques do not account for situations where an executing program must wait for an event, for example, while doing I/O polling or lock acquisition. In these cases, programs have traditionally executed a timing loop such as:

```
/*An example of a timing loop*/
void delay(unsigned long loops) {
    while (loops--)
        ;
}
```

In a timing loop such as this, the processor executing the program will execute a "nop" instruction during the timing loop, consuming power though in actuality the program is waiting for the completion of another task. For example, on a microprocessor which operates at a system clock speed of 10 GHz, waiting for an I/O instruction for 10 PCI bus cycles (33 MHz) while executing such a timing loop is equivalent to wasting 3,000 CPU clock cycles.

On a multi-threaded processor these problems become exacerbated. Timing loops not only waste processor power, they also consume unnecessary execution clock cycles which other threads could utilize. On a multi-threaded processor the actual time period of a timing loop may change depending on the activity of concurrently executing threads. This problem has traditionally been addressed by executing a timing loop utilizing a counter which changes in value. This counter is usually implemented using a special purpose register or memory mapped I/O. An example of such a timing loop is:

```
/* from linux-2.4.20/include/asm-ppc64/delay.h */
/* define these here to prevent circular dependencies */
#define ____HMT_low( )    asm volatile("1,1,1")
#define ____HMT_medium( )    asm volatile("or 2,2,2")
static inline unsigned long ___get_tb(void)
{
    unsigned long rval;
    asm volatile("mftb %0"="r" (rval));
    return rval;
}
static inline void -delay(unsigned long loops)
{
    unsigned long start = ___get_tb( )
    while ((___get_tb( ) -start) <loops)
        ____HMT_low( ):
}
```

This timing loop is specific to the PowerPC architecture, as it uses the "mftb" instruction to access the TBL time stamp counter. Consequently, this loop may allow a program to approximate specific waiting times. However, these time periods may only be based on the system clock utilized in conjunction with the microprocessor, and, because such a loop must use processor specific instructions (mftb) the code is not portable across processor architectures.

Another methodology for queiscing processors during idle periods is to provide a halt instruction for the microprocessor. An example of a conventional halt instruction for the PowerPC architecture is depicted in FIG. 1. Halt instruction 100 has opcode 110 value of nineteen in bits 0-5 and extended opcode 120 value, resident in bits 21-30, of five hundred and thirty.

Usually a halt instruction of this type stops instruction execution on a processor until a timer or I/O interrupt occurs, and are used by operating systems when there is no process to execute. These instructions are usually required to set up interrupts. Setting up these interrupts may be expensive (requiring many instructions). Additionally, these halt instructions may only be executed by system (privileged) software, and do not allow the instruction to specify the amount of time for which the processor is to stop instruction execution.

Thus, a need exists for a method and system for a user to instruct a microprocessor to cease execution of instructions which can specify the clock to utilize, the number of clock cycles to halt, and which does not impede the execution of other threads on a multi-threaded microprocessor.

SUMMARY OF THE INVENTION

Systems and methods for halting the execution of instructions in a microprocessor are disclosed. These systems and methods allow the halting of execution of instructions in one thread of a microprocessor while allowing the execution of instructions in other threads to continue. Additionally, these systems and methods allow a user to specify the time period for which the processor is to stop executing instructions with a fine degree of granularity. The halt instruction may have an operand which allows a programmer to specify which clock of a system is to be utilized in conjunction with the halt instruction and another operand which specifies a number of cycles. The specified number of clock cycles may then be counted using the clock identified in the instruction, after which dispatch of instructions may resume. Usually, when a halt instruction is executed, a signal is asserted to the microprocessor which tells the microprocessor to stop the dispatch of further instructions. A counter is loaded with the value specified in the halt instruction and decremented using the specified clock. When the counter reaches zero the signal to the microprocessor is de-asserted and instruction dispatch may resume.

In one embodiment an instruction is received which is associated with a thread and specifies a clock and the execution of instructions associated with the thread is halted for a number of cycles of the clock.

In another embodiment, the number of cycles is specified in the instruction.

In yet another embodiment, the number of cycles is specified in a register

In still another embodiment, the clock is a CPU clock, a clock used for a time base (TB), a primary I/O bus clock, or a secondary I/O bus clock In other embodiments, halting the execution of instructions comprises halting the dispatch of instructions associated with the thread.

In some embodiments, the execution of instructions associated with the thread resumes after the number of cycles of the clock or if an interrupt occurs.

In some embodiments, the instruction is issued by a user program.

In some embodiments, the instruction is issued by system (privileged) software.

In one particular embodiment, logic is present which comprises a decoder operable to detect the instruction, wherein a counter is loaded with a value and decremented based on a clock when the decoder detects a halt instruction; a dispatch block operable to assert the signal line when the instruction is detected and de-assert the signal line when the counter becomes zero; a clock selector operable to select the clock based on the instruction and a halt count selector operable to select the value loaded into the counter based on the instruction.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DESCRIPTION OF PREFERRED EMBODIMENTS

Figure 1:
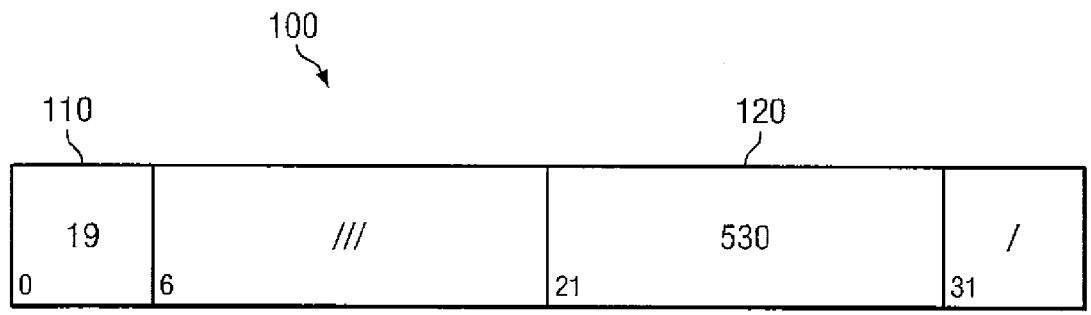
FIG. 1 includes an illustration of a conventional prior art privileged instruction for halting the execution of instructions in a microprocessor.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. After reading the specification, various substitutions, modifications, additions and rearrangements will become apparent to those skilled in the art from this disclosure which do not depart from the scope of the appended claims.

Attention is now directed to systems and methods for halting the execution of instructions in a microprocessor. Typically, a user program that wishes to halt execution of instructions issues a halt instruction. This halt instruction may allow the programmer to specify with a fine degree of granularity the amount of time for which the processor should halt dispatch of instructions. The halt instruction may have an operand which allows a programmer to specify which clock of a system is to be utilized in conjunction with the halt instruction and another operand which specifies a number of cycles. The specified number of clock cycles may then be counted using the clock identified in the instruction, after which dispatch of instructions may resume.

Usually, when a halt instruction is executed a signal is asserted to the microprocessor which tells the microprocessor to stop the dispatch of further instructions. A counter is loaded with the value specified in the halt instruction and decremented using the specified clock. When the counter reaches zero the signal to the microprocessor is de-asserted and instruction dispatch may resume.

Additionally, these system and methods may allow the dispatch of instructions to be halted with respect to one or more of a multiplicity of threads within a microprocessor while allowing the continued execution of instructions associated with the remaining threads. Logic capable of implementing a halt instruction may be associated with each thread of a microprocessor. When a halt instruction is issued by one thread the logic associated with that thread asserts a signal to the microprocessor. In response to the signal from the halt logic associated with a thread, the microprocessor may cease dispatching instructions associated with that thread. Instructions associated with other threads, however, may continue to be dispatched and executed. When the signal from the halt logic is de-asserted, the microprocessor may resume dispatching instructions associated with that thread.

To clarify and aid in an understanding of the term as used throughout the specification, the term "halt instruction" is intended to mean any instruction executable by a microprocessor which is designed to halt the fetch, dispatch, issue or execution of instructions on the microprocessor. It will also be understood that as used herein, to halt the execution of instructions may also encompass halting the fetch, dispatch or issue of instructions.

Before discussing specific embodiments of the present invention, a non-limiting, exemplary microprocessor architecture for using embodiments of the present invention is described. For purposes of illustration, the microprocessor architecture will be described in connection with a microprocessor which is substantially compatible with the PowerPC family of processors by IBM and Motorola. Though this exemplary microprocessor architecture is utilized in conjunction with the various examples described herein, after reading this specification skilled artisans will appreciate that many other microprocessor architectures can be used in conjunction with the described systems and methods.

Figure 2:
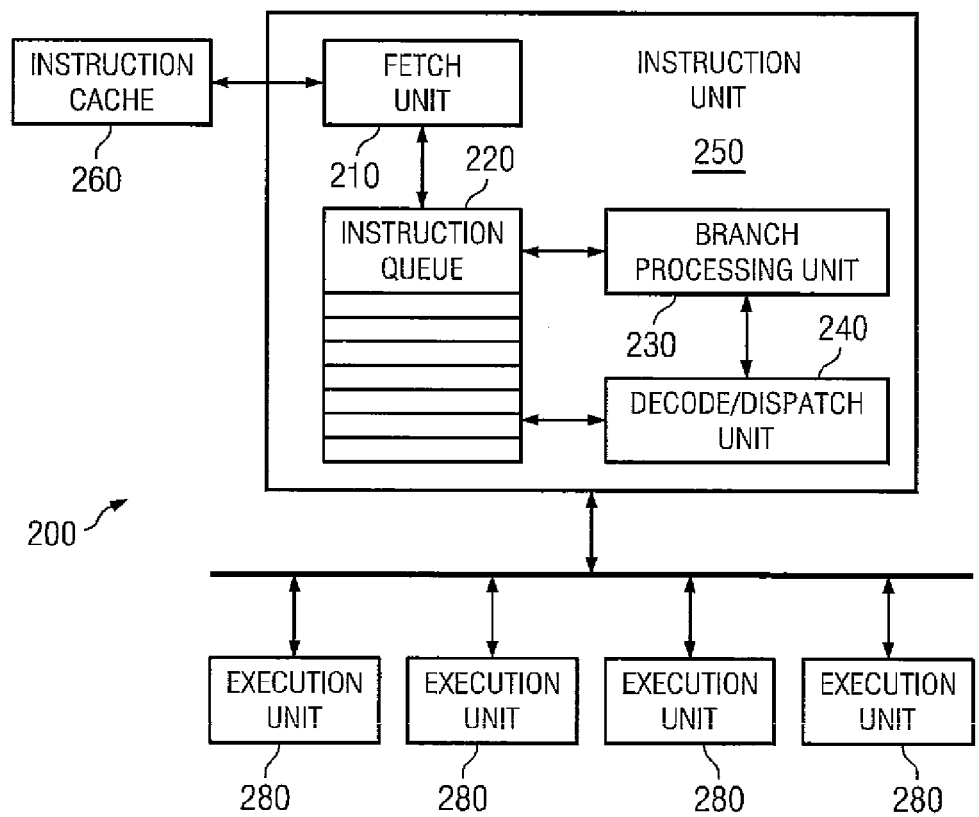
FIG. 2 includes a block diagram of a microprocessor.

FIG. 2 includes a block diagram of a microprocessor 200. Microprocessor 200 may be pipelined and multi-threaded, and include instruction unit 250 and execution units 280. Instruction unit 250, in turn, includes fetch unit 210, decode/dispatch unit 240, instruction queue 220 and branch processing unit 230.

Fetch unit 210 may supply instructions to instruction queue 220 by accessing instruction cache 260 using the address of the next instruction or an address supplied by branch processing unit 230 when a branch is resolved. Typically, fetch unit 210 fetches four sequential instructions from instruction cache 260 and provides these instructions to an eight word instruction queue 220.

Instructions from instruction queue 220 are decoded and dispatched to the appropriate execution unit 280 by decode/dispatch unit 240. In many cases, decode/dispatch unit 240 provides the logic for decoding instructions and issuing them to the appropriate execution unit 280. In one particular embodiment, an eight entry instruction queue 220 consists of two four entry queues, a decode queue and a dispatch queue. Decode logic of decode/dispatch unit 240 decodes the four instruction in the decode queue, while the dispatch logic of decode/dispatch unit 240 evaluates the instructions in the dispatch queue for possible dispatch, and allocates instructions to the appropriate execution unit 280. In a multi-threaded implementation of microprocessor 200, decode/dispatch unit 240 may also be responsible for switching between threads and determining if instructions are available for a particular thread.

Execution units 280 are responsible for the execution of different types of instruction issued from dispatch logic of decode/dispatch unit 240. Execution units 280 may include a series of arithmetic execution units. These units may include single cycle integer units responsible for executing integer instructions. A floating point unit may be responsible for executing single and double precision floating point operations, while a load store execution unit may transfer data between a cache and a results bus, route data to other execution units, and transfer data to and from system memory. The load store unit may also support cache control instructions and load/store instructions.

Figure 3:
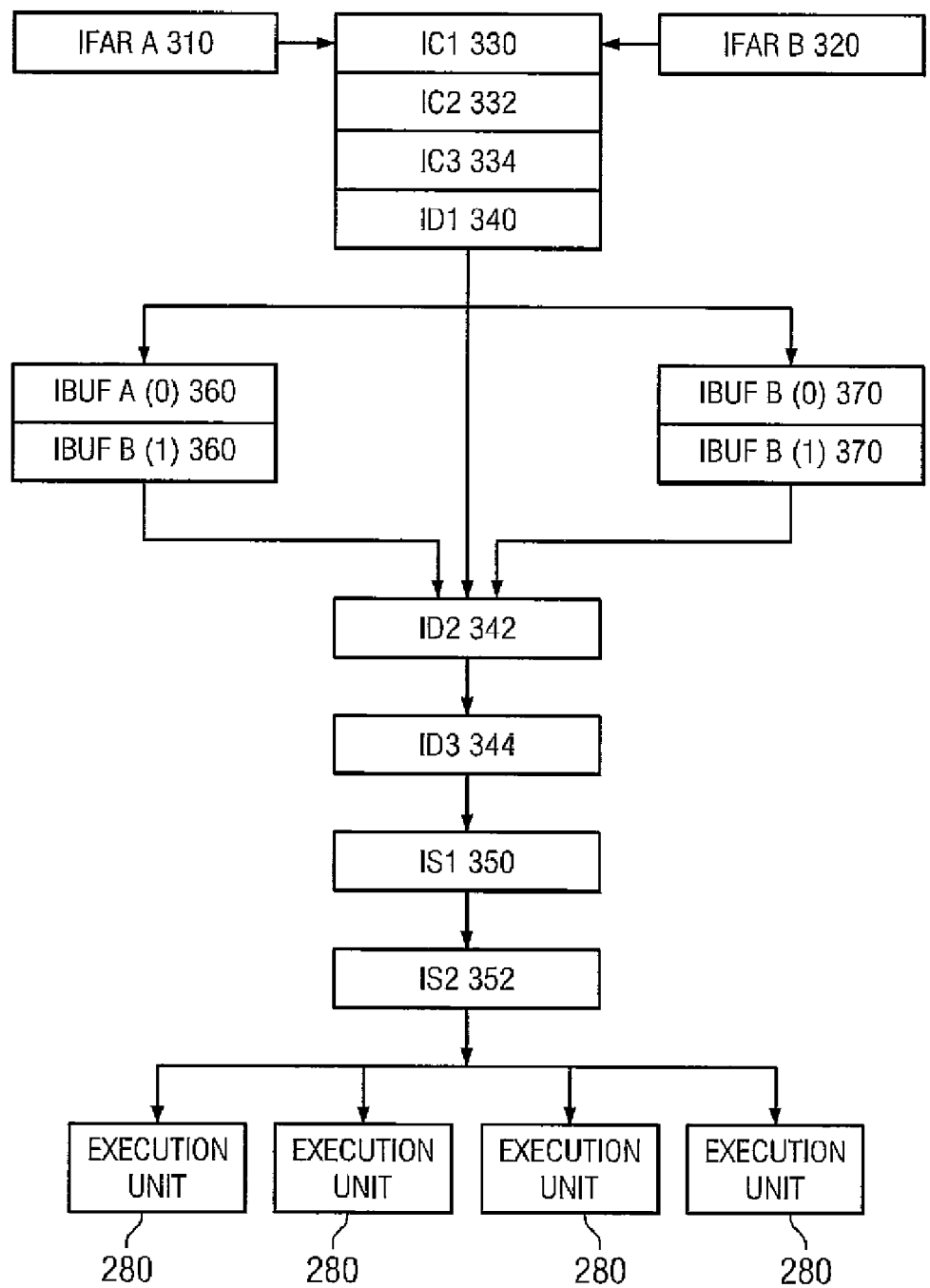
FIG. 3 includes a representation of instruction flow through a pipelined multi-threaded microprocessor.

Microprocessor 200 may be multi-threaded. A diagram of the flow of instructions through instruction unit 250 in a multi-threaded microprocessor which supports two threads is illustrated in FIG. 3. In order to facilitate implementation of various features of microprocessor 200, the flow of instructions through instruction unit 250 may be partitioned into a series of stages 330-352, commonly know as pipelining. For purposes of this illustration, the two supported threads will be referred to as thread A and thread B.

Fetch unit 240 may maintain a separate instruction fetch address register (IFAR) 310, 320 for each thread. IFAR 310 indicates from where in instruction cache 260 instructions are to be fetched in conjunction with thread A, while IFAR 320 indicates from where in instruction cache 260 instructions are to be fetched in conjunction with thread B. Instructions are fetched alternately from the address indicated by IFAR 310 and the address indicated by IFAR 320. Typically, the fetch unit 210 provides instructions to instruction queue 220 by fetching four instructions from instruction cache 260 in one cycle. In some embodiments, instruction queue 220 holds 16 instructions, eight for each of thread A and thread B. For example, stage IC1 330 may contain four instructions fetched in accordance with thread A, stage IC2 332 may contain four instructions fetched according to thread B, stage IC3 334 four instructions associated with thread A, and stage ID1 340 four instructions of thread B. Instructions flow from instruction queue 260 to decode/dispatch unit 240. When instructions reach stage ID1 340 they are decoded and forwarded to stage ID2 342 for dispatch, or inserted into instruction buffers 360, 370. In some embodiments, each instruction buffer 360, 370 is configured to store two sets of four instructions per thread, and each buffer 360, 370 stores instructions for only one thread. For example, instruction buffer 360 may contain only instructions for thread A while instruction buffer 370 contains only instructions associated with thread B.

At stage ID2 342, an instruction for a thread may be dispatched. Logic within decode/dispatch unit 240 may determine which thread is executing during any given cycle. If there is an instruction available for a selected thread, and the thread is not blocked, then an instruction may be dispatched at stage ID2 342 for that thread. An instruction may available for a thread if there is a valid instruction in stage ID1 342 or in instruction buffer 360, 370 corresponding to that thread.

After an instruction for a thread is dispatched in stage ID2 342 the instruction may proceed through the remainder of stages of the dispatch pipeline 344-350 until the instruction is issued at stage IS2 352 to the appropriate execution unit 280.

Figure 4:
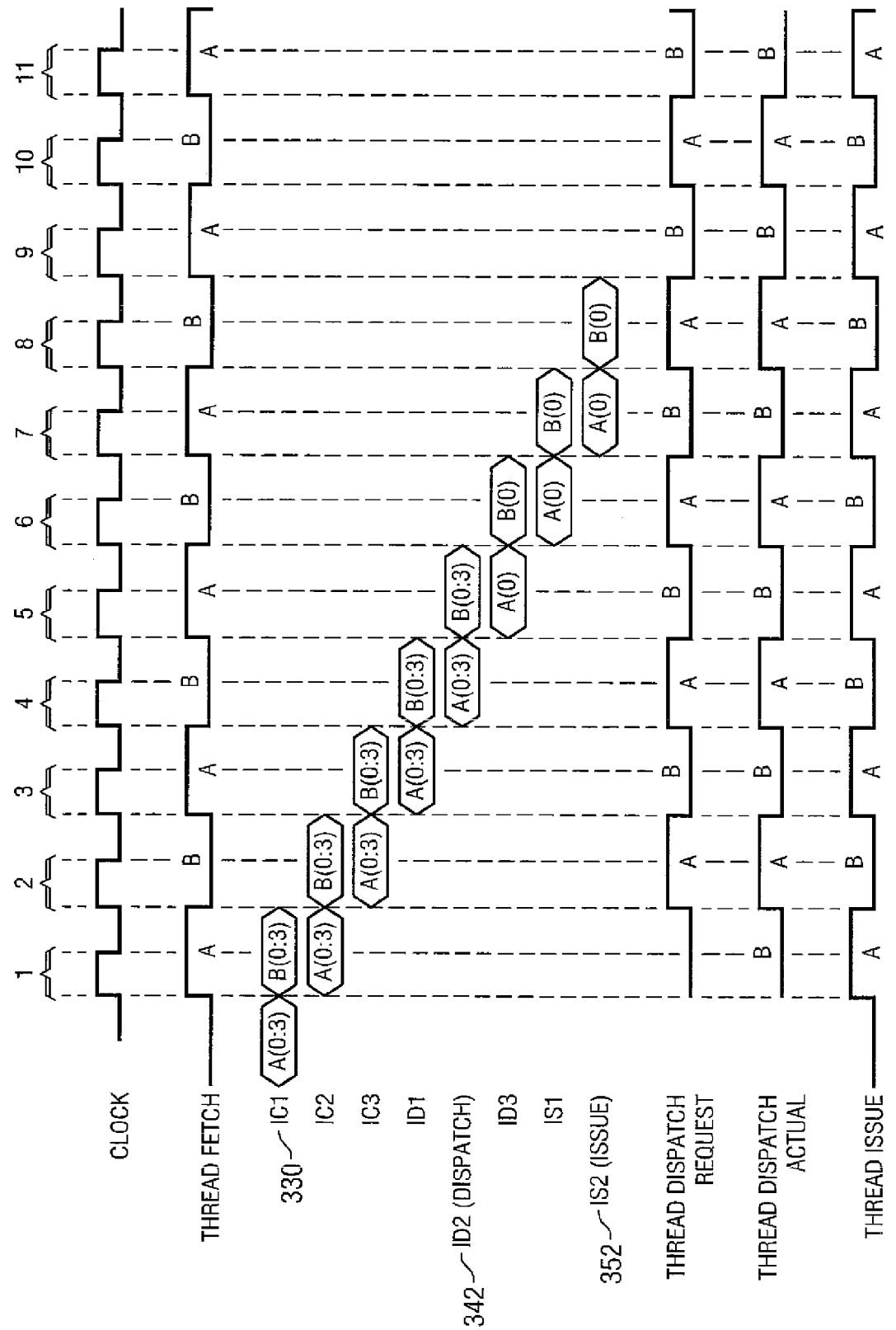
FIG. 4 includes a timing diagram of instruction flow through a pipelined multi-threaded microprocessor.

FIG. 4 depicts instruction flow through the pipeline stages depicted in FIG. 3, illustrating one example of the timing of a normal fetch, dispatch and issue of an instruction with no branch re-directs or pipeline stalls. In the example depicted, the fetch, dispatch and issue alternate between threads with every cycle. In stage IC1 330 four instructions are fetched for thread A. During the next cycle, four instructions for thread B are fetched in stage IC1 330. These instructions proceed through the pipeline, until eventually one of the instruction for thread A is dispatched at stage ID2 342 for eventual issue at stage IS2 352, followed by the dispatch of one instruction for thread B at stage ID2 342 and its issued at stage IS2 352. Those of ordinary skill in the art will realize that the pipeline and stages depicted in FIGS. 3 and 4 are exemplary only, and a wide variety of pipeline architectures may be implemented in accordance with microprocessor 200.

Figure 5:
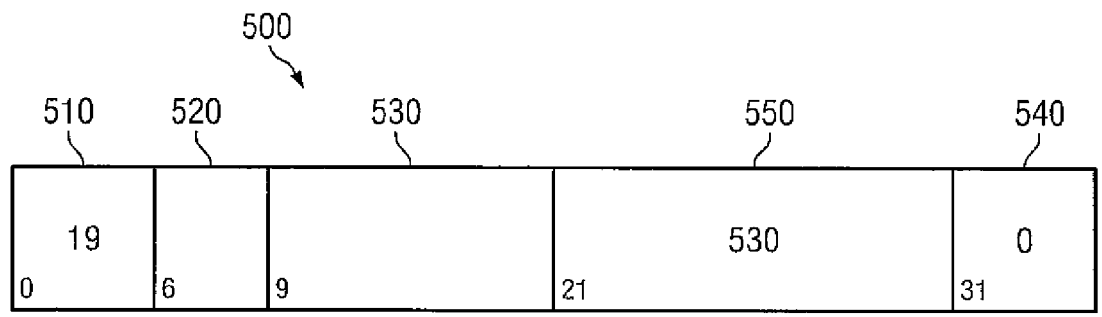
FIG. 5 includes an illustration of one embodiment of an instruction for halting the execution of instructions in a microprocessor.
Figure 6:
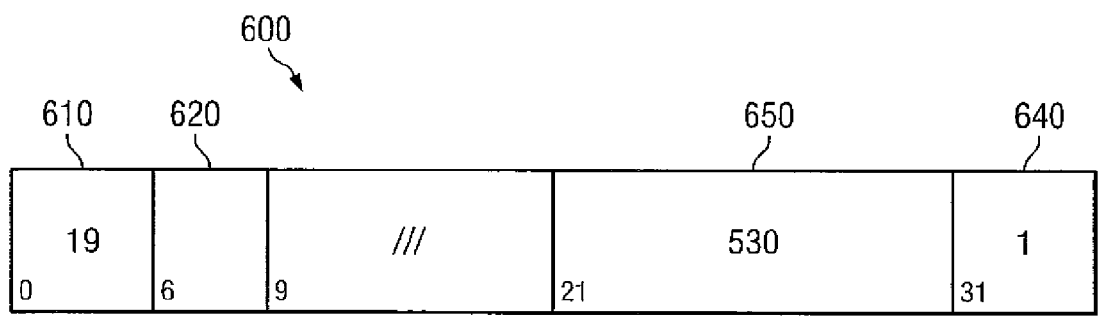
FIG. 6 includes an illustration of another embodiment of an instruction for halting the execution of instructions in a microprocessor.

As discussed above, it is occasionally desirable to halt the execution of instructions in microprocessor 200. This may be accomplished by issuing an instruction which causes the temporary halt of instruction dispatching, fetching or issuing. Ideally, in a multi-threaded environment, an instruction of this type would allow the temporary halt of instruction dispatching, fetching or issuing with respect to one thread while allowing other threads to continue executing. FIGS. 5 and 6 depict two embodiments of such an instruction.

Turning now to FIG. 5, an instruction 500 which allows the halt of instruction execution is depicted. In one embodiment, instruction word 500 may cause instruction dispatching to be halted until a counter reaches zero. Instruction word 500 may comprise primary opcode 510, extended opcode 550, two fields 520, 530 and version designator 540. Opcode 510 may have the pneumonic "halt," and comprise bits 0-5 of instruction word 500. In some embodiments, opcode 510 may have an identical value to conventional halt instruction 100 implemented in the same architecture. For example, for the PowerPC architecture opcode 510 may have the value 19, the same as opcode 110 for conventional privileged halt instruction 100.

Extended opcode 550 may comprise bits 21-30 and be used to differentiate between versions of instructions with the same primary opcode 510. To continue with the PowerPC architecture based example above, extended opcode 550 may have the value five hundred fourteen, to differentiate instruction 500 from privileged conventional halt instruction 100 with identical opcode 110 value of nineteen but extended opcode 120 value of five hundred and thirty.

Version designator 540 may comprise bit 31 of instruction 500 and further designate a version of halt instruction 500 in the case where opcode 510 and extended opcode 550 may have myriad forms. In one embodiment, version designator 540 having a value of zero designates the embodiment of instruction 500 depicted in FIG. 5.

One field 520 of instruction 500 may comprise bits 6-8 of the instruction word and specify a clock to be used with the embodiment of the instruction. For example, a value of "1000" in field 520 may indicate the CPU clock, a value of "1001" may designate the clock used for the time base, a value of "010" might indicate the primary I/O bus clock, while "011" may indicate the secondary I/O bus clock. It will be apparent to those of skill in the art that any number of clocks may be designated, and various values for field 520 may be associated with each of these clocks.

Field 530 may be composed of bits 9-20 of the instruction word, and specify a number of clock cycles to halt instruction execution. In some embodiments, this value is a 12 bit unsigned value. Upon execution of instruction 500 this 12 bit unsigned value is loaded into a counter register internal to microprocessor 200. This counter register is then decremented according to the clock specified in field 520.

Assuming the pneumonic for opcode 510 of instruction 500 is "halt", the instruction may be executed by a user program as follows:

halt 0, 100 #will halt dispatch of instructions for 100 CPU
    #clock cycles
halt 1, 100 #will halt dispatch of instructions for 100 bus
    #clock cycles
halt 2, 100 #will halt dispatch of instructions for 100 I/O
    #bus clock cycles
halt 3, 100 #will halt dispatch of instructions for 100
    #secondary I/O bus clock cycles Another version of an instruction for halting the dispatch of instructions is depicted in FIG. 6. In one embodiment, instruction 600 may cause instruction dispatching to be halted until an internal counter reaches zero. This internal counter may be loaded with a value from ia register within microprocessor 200 such as the count register (CTR) or any general purpose register.

Instruction 600 may comprise primary opcode 610, extended opcode 650, field 620, and version designator 640. Opcode 610 may have the pneumonic "halt," and comprise bits 0-5 of instruction 600. In some embodiments, opcode 610 may have an identical value to conventional halt instruction 100 implemented in the architecture. For example, for the PowerPC architecture opcode 610 may have the value nineteen, the opcode 110 for the conventional privileged halt instruction 100.

Extended opcode 650 may comprise bits 21-30 and be used to differentiate between versions of instruction 600 with the same primary opcode 610. To continue with the example in the PowerPC architecture, extended opcode 650 may have the value five hundred fourteen, to differentiate instruction 600 from privileged conventional halt instruction 100 with identical opcode 110 value of nineteen but an extended opcode 120 value of five hundred and thirty.

Version designator 640 may comprise bit 31 of instruction 600, and further differentiate instruction 600, in the case where another version of instruction 600 exists with identical opcode 610 and extended opcode 650. In one embodiment, version designator 640 having a value of one designates the embodiment of instruction 600 depicted in FIG. 6, though opcode 610 and extended opcode 650 are the same value as opcode 510 and extended opcode 550 of instruction 500 depicted in FIG. 5.

Field 620 of instruction 600 may comprise bits 6-8 of instruction word 600 and specify a clock to be used with the embodiment of the instruction. For example, a value of "000" in field 620 may indicate the CPU clock, a value of "001" may designate the clock used for the time base, a value of "010" might indicate the primary I/O bus clock, while "011" may indicate the secondary I/O bus clock. It will be apparent to those of skill in the art that any number of clocks may be designated, and various values for field 620 may be associated with each of these clocks.

Figure 7:
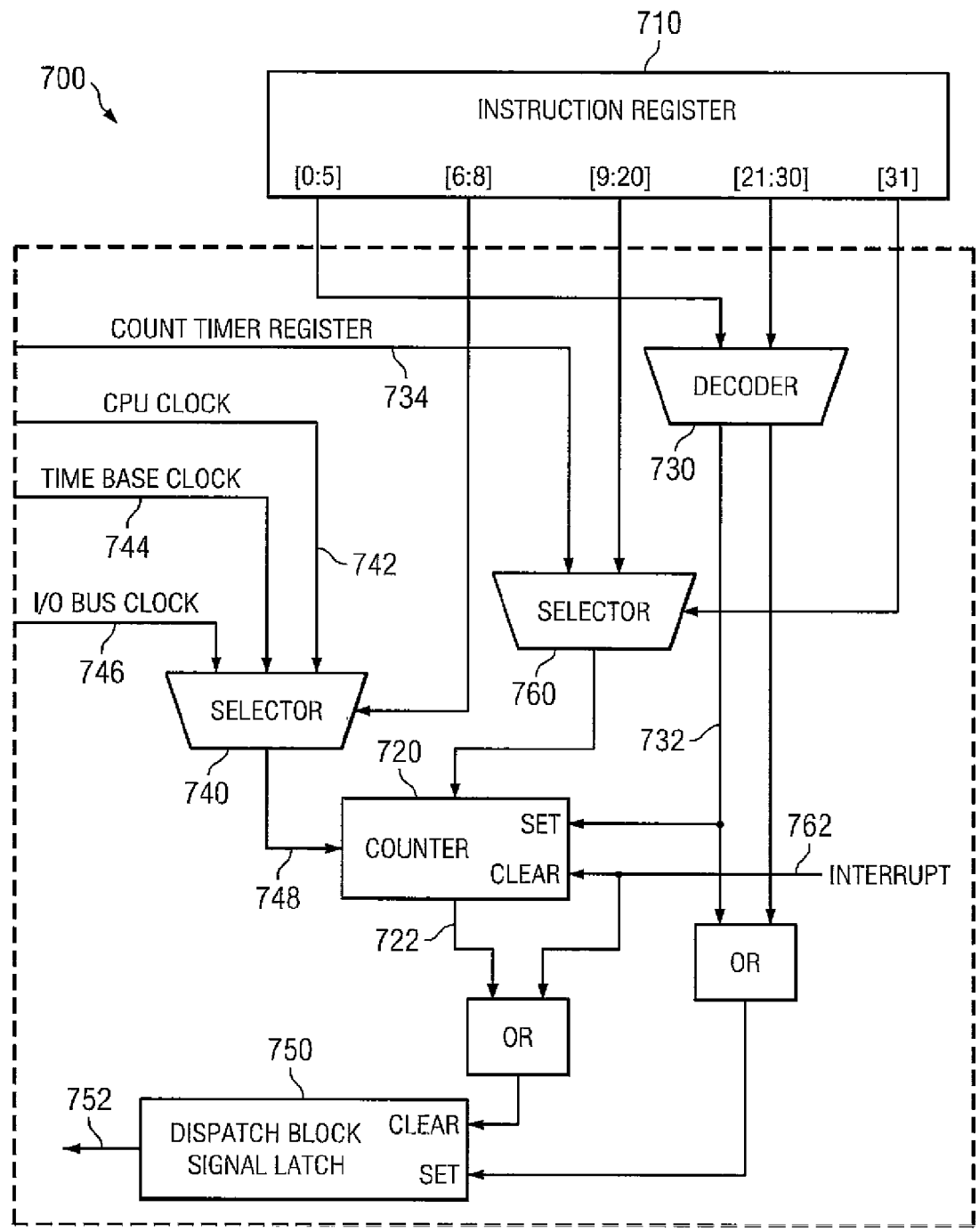
FIG. 7 depicts a block diagram of one embodiment of logic suitable to implement an instruction for halting the execution of instructions in a microprocessor.

Upon execution of instruction 600 a value from a first register internal to microprocessor 200 may be loaded into a second register internal to microprocessor 200. This second register may then be decremented according to the clock specified in field 620. In one embodiment, in accordance with the PowerPC architecture, the first register is the count register (CTR). The 32 bit unsigned value is loaded from the CTR register into an internal counter, and decremented with every cycle of the clock specified in field 620. Again, assuming the pneumonic for instruction 600 is "halt", the instruction may be executed by a user program as follows:

halt 0    #will decrement counter using CPU clock
halt 1    #will decrement counter using bus clock
halt 2    #will decrement counter using I/O bus clock
halt 3    #will decrement counter using secondary I/O bus
          #clock cycles Turning now to FIG. 7, one embodiment of logic 700 for implementing the types of halt instructions described above is depicted. Logic 700 may be associated with a register for holding an instruction such as instruction register 710 of microprocessor 200 and comprise counter 720, decoder 730, halt count selector 760, clock selector 740, and dispatch block signal latch 750.

Decoder 730 detects a halt instruction by decoding the opcode (bits 0-5) and extended opcode (bits 21-30) fields of instruction register 710. If a halt instruction of the type described with respect to FIGS. 5 and 6 is detected, decoder 730 asserts line 732, setting dispatch block signal latch 750, which in turn holds signal line 752 high. When signal line 752 is high, instruction unit 250 of microprocessor 200 may block the dispatch or fetch of instructions.

Additionally, when line 732 is asserted by decoder 730, counter 720 is set and loaded with the output of halt count selector 760. The output of halt count selector 760 is selected based on the version identifier (bit 31) of instruction register 710. If the instruction in instruction register 710 is of the type described with respect to FIG. 5, bit 31 contains a zero and the output of halt count selector will be the value contained in bits 9-20 of instruction register 71b.

If, however, the instruction in instruction register 710 is of the type described with respect to FIG. 6, bit 31 may contain a one and the output of halt count selector will be the value of the register on line 734. In one embodiment, the register whose value is output by halt count selector 760 is the count register (CTR). This register may be written with a value by the user before the execution of the halt instruction.

Once counter 720 is loaded with the output of halt count selector 760, this value may be decremented using the clock output by clock selector 740. Clock selector 740 selects one of incoming clocks 742, 744, 746 based on the value in bits 6-8 of instruction register 710. The selected clock is output to counter 720 on line 748. In one embodiment, clock selector may select from incoming CPU clock 742, time base clock 744 and I/O bus clock 746.

Once counter 720 is loaded with a value it may be decremented using incoming clock 748 until the value in counter 720 becomes zero, at which point output line 722 of counter 720 is asserted, clearing dispatch block signal latch 750 and causing signal line 752 to go low. When signal line 752 goes low, instruction unit 250 of microprocessor 200 may resume the dispatch of instructions. Additionally, if an interrupt is asserted on line 762 this may clear dispatch block signal latch 750 and counter 720, causing signal line 752 to go low and instruction unit 250 of microprocessor 200 to resume the dispatch of instructions.

Figure 8:
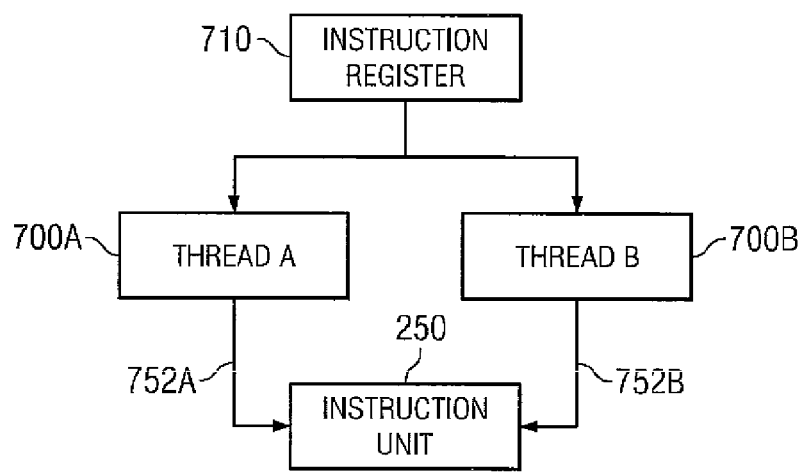
FIG. 8 depicts a block diagram of logic suitable for halting the execution of instructions in a microprocessor with respect to one or more of a set of threads.

FIG. 8 depicts how instruction dispatching with respect to one thread may be halted while allowing other threads to continue executing. Each thread executing on multi-threaded microprocessor 200 may be associated with its own logic 700A, 700B. When a halt instruction is issued, only the logic 700A, 700B associated with the thread that issued the halt instruction is activated, holding its respective signal line 752 high. Instruction unit 250 may then halt only instructions for the thread that issued the halt instruction based on which signal line 752 is high.

To continue with the above example, logic 700A may be associated with thread A while logic 700B may be associated with thread B. When an instruction of the type discussed above is executed, only the logic associated with the thread which issued the instruction is activated.

For example, suppose thread A issues a halt instruction. In this instance, logic 700A associated with thread A is activated, holding line 752A high. When line 752A is high, instruction unit 250 may halt instruction dispatch for thread A only, allowing instructions associated with thread B to continue being dispatched and executed. Since logic 700A is associated with thread A, and is only activated when thread A issues a halt instruction of the type described with respect to FIGS. 5 and 6, signal 752A coming from logic 700A may also be also be associated with thread A, allowing instruction unit 250 of microprocessor 200 to halt instruction dispatch only for thread A.

It will be clear to those of ordinary skill in the art after reading this disclosure that instructions 500, 600 of the type discussed and associated logic 700 may be tailored to implement halt instructions of the type described in a variety of different microprocessor architectures, including little and big endian architectures, architectures with different instruction formats, architectures with 32 bit, 64 bit or any other size instruction word, single and multi-threaded architectures, etc.

Note that not all of the logic described with respect to FIG. 7 is necessary, that an element may not be required, and that further elements may be utilized in addition to the ones depicted, including additional gates, latches etc. Additionally, the order in which each element of logic 700 is described is not necessarily the order in which it is utilized. After reading this specification, a person of ordinary skill in the art will be capable of determining which arrangement of logic 700 will be best suited to a particular implementation.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method of halting instruction execution in a microprocessor, comprising:
    executing instructions associated with a first thread and a second thread in the microprocessor according to a first clock;
    receiving an instruction, wherein the instruction is associated with the first thread and specifies a source of a second clock and a number of cycles, wherein the first clock and the second clock are different speeds; and
    halting the execution of instructions associated with the first thread for the number of cycles of the specified second clock while continuing to execute instructions associated with the second thread according to the first clock.

2. The method of claim 1, wherein the number of cycles is specified in the instruction.

3. The method of claim 1, wherein the number of cycles is specified in a register.

4. The method of claim 3, wherein the register is the Count Register (CTR).

5. The method of claim 1, wherein the specified second clock is a CPU clock, a clock used for a time base (TB), a primary I/O bus clock, or a secondary I/O bus clock.

6. The method of claim 1, wherein halting the execution of instruction comprises halting the dispatch of instructions associated with the first thread.

7. The method of claim 1, further comprising resuming the execution of instructions associated with the first thread after the number of cycles of the specified second clock or if an interrupt occurs.

8. The method of claim 7, wherein the interrupt is a system-caused interrupt or an imprecise instruction interrupt.

9. The method of claim 1, wherein the instruction is issued by a user program.

10. A computer readable storage device having instruction for halting the execution of instructions in a microprocessor, wherein the microprocessor is executing instructions associated with a first thread and a second thread according to a first clock and the instruction is associated with a first thread and specifies a source of a second clock which is different in speed than the first clock, the instruction embodied within the computer readable storage device and operable to:
Halt the execution of instructions associated with the first thread for a number of cycles a number of cycles of the specified second clock while the microprocessor continues to execute instructions associated with the second thread according to the first clock.

11. The computer readable storage device of claim 10, wherein the number of cycles is specified in the instruction.

12. The computer readable storage device of claim 10, wherein the number of cycles is specified in a register.

13. The computer readable storage device of claim 12, wherein the register is the Count Register (CTR).

14. The computer readable storage device of claim 10, wherein the specified second clock is a CPU clock, a clock used for a time base (TB), a primary I/O bus clock, or a secondary I/O bus clock.

15. The computer readable storage device of claim 10, wherein halting the execution of instructions comprises halting the dispatch of instructions associated with the first thread.

16. The computer readable storage device of claim 10, wherein the instruction is further operable to: resume the execution of instructions associated with the first thread after the number of cycles of the specified second clock or if an interrupt occurs.

17. The computer readable storage device of claim 16, wherein the interrupt is a system-caused interrupt or an imprecise instruction interrupt.

18. The computer readable storage device of claim 10, wherein the instruction is issued by a user program.

19. A system for halting instruction execution in a microprocessor, comprising:
a microprocessor operable to execute instructions associated with a first thread and a second thread accordin to a first clock; and
logic operable to:
receive an instruction, wherein the instruction is associated with a first thread and specifies a source of a second clock which is different in speed than the first clock;
assert a signal line, wherein the assertion of the signal line is configured to halt the execution of instructions associated with the first thread while the microprocessor continues to execute instructions associated with the second thread according to the first clock;
decrement a counter based on the specified second clock; and
de-assert the signal line based on the counter, wherein the de-assertion of the signal line is configured to resume execution of instructions associated with the first thread.

20. The system of claim 19, wherein the logic comprises:
a decoder operable to detect the instruction, wherein the counter is loaded with a value and decremented based on the specified second clock when the decoder detects a halt instruction; and
a dispatch block operable to assert the signal line when the instruction is detected and de-assert the signal line when the counter becomes zero.

21. The system of claim 20, wherein the logic further comprises a clock selector operable to select the specified second clock based on the instruction.

22. The system of claim 21, wherein the specified second clock is a CPU clock, a time base clock, a primary I/O bus clock or a secondary I/O bus clock.

23. The system of claim 21, wherein the logic further comprises a halt count selector operable to select the value loaded into the counter based on the instruction.

24. The system of claim 23, wherein the value is contained in the instruction or loaded from a register.

25. The system of claim 24, wherein the register is the Count Register (CTR).

26. The system of claim 19, wherein the instruction is issued by a user program.

27. The system of claim 19, wherein the microprocessor halts the dispatching of instructions associated with the first thread in response to the assertion of the signal line and resumes the dispatching of instruction in response to the de-assertion of the signal line.

28. The system of claim 27, wherein the logic is further operable to de-assert the signal line if an interrupt occurs.

29. The system of claim 28, wherein the interrupt is a system-caused or imprecise instruction.

* * * * *